United States Patent [19]

Gustafsson

[11] Patent Number: 4,822,202
[45] Date of Patent: Apr. 18, 1989

[54] LOAD ABSORBING GLUE JOINTING PLUG, PREFERABLY FOR JOINING TOGETHER FURNITURE COMPONENTS

[75] Inventor: Bror Gustafsson, Gislaved, Sweden
[73] Assignee: Sedaplast AB, Gislaved, Sweden
[21] Appl. No.: 9,050
[22] Filed: Jan. 29, 1987
[30] Foreign Application Priority Data
Feb. 12, 1986 [SE] Sweden .................. 8600619
[51] Int. Cl.⁴ .................. F16B 12/24; F16B 13/04
[52] U.S. Cl. .................. 403/268; 403/267; 403/298
[58] Field of Search .................. 403/266–268, 403/298, 292, 265, 293, 305, 300, 361

[56] References Cited

U.S. PATENT DOCUMENTS

| | | | |
|---|---|---|---|
| 2,221,141 | 11/1940 | Kindt | 403/360 |
| 2,702,926 | 3/1955 | Rahaim | 403/298 |
| 3,298,144 | 1/1967 | Fischer | 403/361 X |
| 3,405,592 | 10/1968 | Blodee | 403/267 X |
| 3,756,635 | 9/1973 | Beers | |
| 3,883,258 | 5/1975 | Hewson | 403/298 |
| 4,248,017 | 2/1981 | Micallef | 403/267 X |
| 4,454,699 | 6/1984 | Strobl | 403/298 X |
| 4,681,477 | 7/1987 | Fischer | 403/298 |

FOREIGN PATENT DOCUMENTS

| | | |
|---|---|---|
| 0119318 | 9/1984 | European Pat. Off. |
| 1400906 | 12/1968 | Fed. Rep. of Germany |
| 2646351 | 5/1977 | Fed. Rep. of Germany |
| 3309954 | 9/1984 | Fed. Rep. of Germany ... 403/405.1 |
| WO80/00993 | 5/1980 | PCT Int'l Appl. |
| 1454264 | 11/1976 | United Kingdom |

Primary Examiner—Andrew V. Kundrat
Assistant Examiner—Peter M. Cuomo
Attorney, Agent, or Firm—Young & Thompson

[57] ABSTRACT

A plastic glue plug has an axially extending bore which opens out at the insertion end of the plug. The bore contains a given quantity of glue which is held sealingly enclosed by a plunger partially inserted to a starting position in the bore. When the plug is pressed into an attachment hole, the plunger is forced to a bottom position in the plug while, at the same time, pressing glue beyond the plunger and out of the plug at the insertion end thereof, this glue being forced onto the mutually abutting surfaces of the plug and the attachment hole.

6 Claims, 3 Drawing Sheets

LOAD ABSORBING GLUE JOINTING PLUG, PREFERABLY FOR JOINING TOGETHER FURNITURE COMPONENTS

The present invention relates to a load absorbing jointing plug which is intended to be inserted into and glued firmly in a cylindrical attachment hole located in a structural member, such as a wooden member, and which is particularly intended for use when assembling furniture.

When joining together or assembling furniture components with the aid of a glue jointing element it is known from International Patent Application No. PCT/SE79/00231 to use a jointing element that has double walls between which a given quantity of glue is applied, the cross-sectional dimension of this part of the jointing element being greater than the cavity or space into which the element is to be inserted when fitting the structural members together, such that during a fitting operation the two walls are urged towards one another, therewith forcing glue through apertures provided in the walls and onto the external surfaces of the jointing element. The glue used is preferably an inactive glue of a known kind which will harden without requiring the addition of a hardener or curing agent, but with which the hardening process is initiated by moisture or the humidity of the air. The glue used may also be one which will harden as a result of contact with metal surfaces.

This known jointing element, however, has a flat configuration and will not therefore solve problems encountered when using cylindrical glue plugs intended for insertion into cylindrical attachment holes and firmly glued therein.

The object of the present invention is to provide a load absorbing jointing plug of the aforesaid kind which encloses a given quantity of glue which when the plug is driven into the attachment hole, is forced to flow out between the outer surface of the plug and the wall surface of the attachment hole. The plug according to the invention is primarily intended as a plug for joining structural members together, and to this end may have the form of a dowel consisting of two identical halves. Alternatively, the plug may have the form of an anchorage for a fastener, such as a screw, bolt, hook or the like.

The object of the present invention is achieved with a plug which, in accordance with the invention, is characterized in that the plug has provided therein an axially extending bore which opens out at the insertion or leading end of the plug, the bore containing a given quantity of glue which is enclosed sealingly in the bore by a plunger partially inserted into said bore. The bore and the plunger are so constructed in relation to one another that pressure exerted by the plunger on the glue will force the glue beyond the plunger and out from the plug at the insertion or leading end thereof. In the in-use position, the glue forced out onto the bottom of the attachment hole will, in turn, be acted upon by the penetrating plug in a manner such as to force the glue to flow out between the wall of the attachment hole and the surface of the plug.

These and other characterizing features of the invention, together with advantages afforded thereby, will now be described in more detail with reference to the accompanying drawings, which illustrate an exemplifying embodiment of a plug constructed in accordance with the invention.

The illustrated plug and its components are preferably made of plastic.

Figure 1:
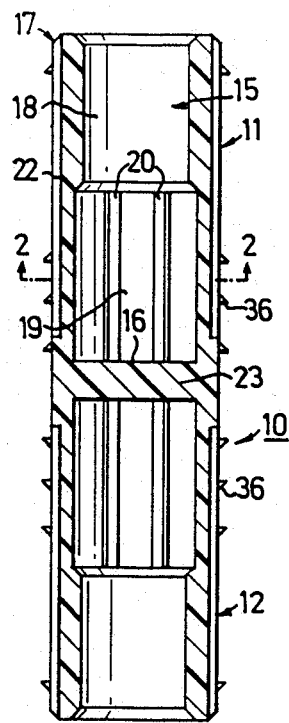
FIG. 1 is a longitudinal sectional view of the actual plug itself, taken on the line 1—1 in FIG. 2.
Figure 2:
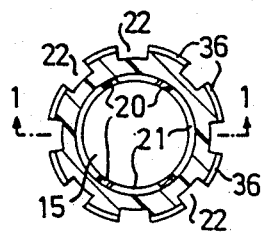
FIG. 2 is a cross-sectional view taken on the line 2—2 in FIG. 1.
Figure 5:
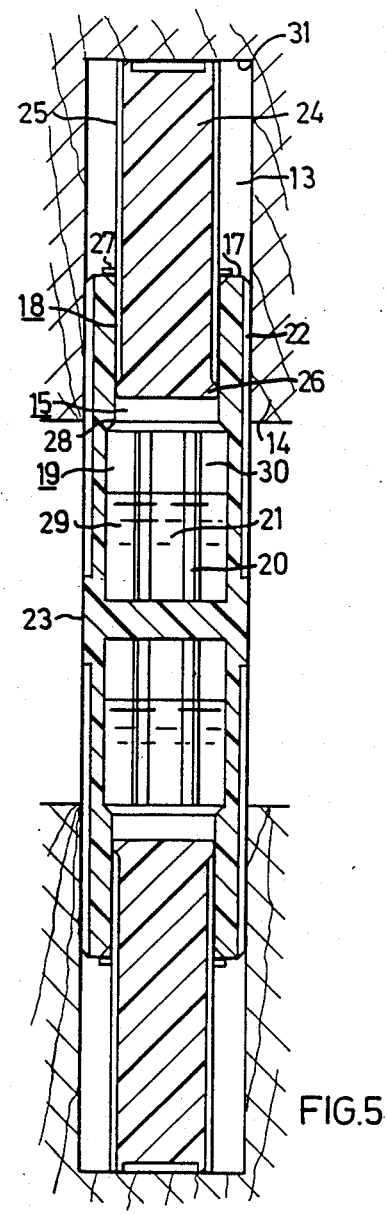
Figure 6:
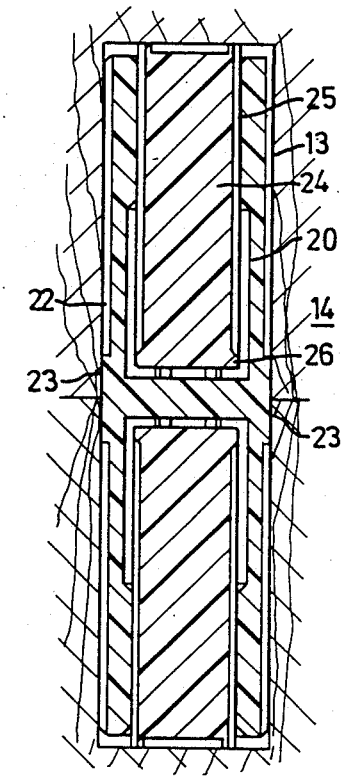
Figure 7:
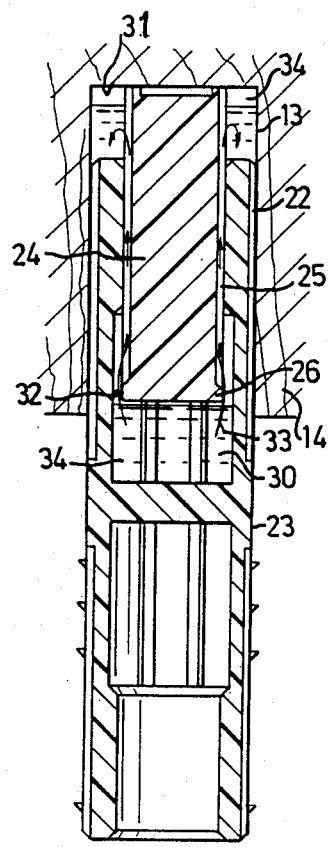
Figure 8:
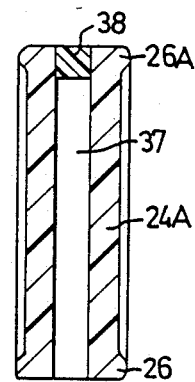

FIG. 5 the plug of FIG. 1 with the plungers inserted in the plug and located in a starting position subsequent to given quantities of glue having been first applied into the plug, each of the two end parts of the plug being inserted into a respective attachment hole located in a respective one of two wooden structural members to be joined together;

FIG. 6 illustrates the two wooden structural members pressed against one another and the plungers urged to their respective bottom positions, thereby forcing glue to pass out from the plug and flow between the mutually abutting surfaces of the respective holes and plugs;

FIG. 7 an intermediate position of one plunger during its travel between the starting position of the and its bottom position; and FIG. 8 is a longitudinal section of a preferred plunger having an axial channel which has been closed after fixing glue and mounting the plunger in the plug.

The plug 10 illustrated in FIG. 1 is a so-called double plug having identical halves 11,12, so that the plug can be used as a dowel for joining two structural members together. Alternatively, one half of the plug, such as the plug half 12, may be solid so as to form an anchorage for a screw, a bolt, or some corresponding fastener.

Since the two halves of the illustrated plug are mutually identical, only the upper plug-half 11 shown in the Figures will be described in the following.

The illustrated plug is cylindrical and is intended to fit into the cylindrical attachment hole 13 located in a structural member 14, which may be made of wood, said hole 13 being shown in FIGS. 5, 6 and 7.

The plug has provided therein a cylindrical bore 15 which has a bottom 16 and which extends to the insertion or leading end 17 of the plug. The bore is divided into an axially outer cylindrical bore part 18 and an axially inner cylindrical bore part 19, this latter part being of greater radius than the outer part 18. The inner bore-part of the illustrated plug of this embodiment is provided with a plurality of axially extending lands 20, the radially inner surfaces of which lie on a geometric cylinder in the extension of the outer cylindrical bore part, said lands defining glue cavities 21 therebetween.

The upper half of the plug illustrated in FIG. 1 has arranged on the outer surfaces thereof a plurality of axially extending glue channels 22, which are somewhat shorter than the bore and which terminate at a cylindrical centrepart 23 of the plug.

Figure 3:
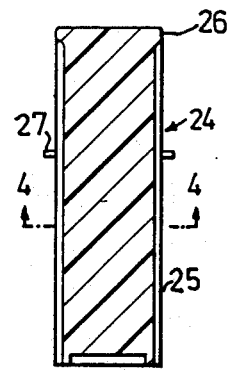
FIG. 3 is a longitudinal sectional view of one of the plungers, taken on the line 3—3 in FIG. 4.
Figure 4:
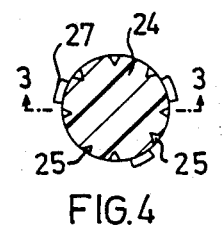
FIG. 4 is a cross-section taken on the line 4—4 in FIG. 3.

The bore is intended to accommodate a cylindrical plunger 24 having the construction illustrated in FIGS. 3 and 4. The plunger is slightly longer than the bore, as will be seen from FIG. 6 which shows the plunger almost fully inserted in the bore, the plunger being guided relatively accurately in the outer bore part 18 and against the axially extending lands 20 in the inner part 19 of said bore. The plug is strengthened effectively in this way, since the plunger is able to take-up bending or flexural forces together with the plug.

As shown in FIGS. 3 and 4, the plunger has provided thereon a plurality of axially extending glue channels 25, which widen in cross-section towards the surface of the plunger. The glue channels extend axially to the proximity of the inner end of the plunger, as seen from the starting position thereof, at which end the plunger has formed thereon a relatively narrow piston or bulb 26 or some like sealing element, which fits sealingly in the upper cylindrical part 18 of the bore.

The plunger is provided at a predetermined location thereon with a plurality of small projections or thin flanges 27, which serve as abutments for limiting the insertion of the plunger into the bore to the starting position shown in FIG. 5, in which position the bulb 26 is still located in a sealing position in the proximity of the junction 28 between the outer and inner parts 18 and 19 of the bore.

Prior to inserting the plunger into the bore, the bore is filled with a given portion of glue 29 (FIG. 5) so as to fill the glue chamber 30 located between the inner end of the plunger and the bottom 16 of the bore to about half its capacity or slightly thereabove, depending on the amount of glue which is to be pressed out.

FIG. 5 illustrates the plug inserted in the attachment hole 13 with the end of the plunger abutting the bottom 31 of the hole. The plunger is located in its starting position. When the plunger is pressed inwardly in the hole, for instance to the intermediate position illustrated in FIG. 7, the bulb 26 first leaves its sealing position and moves into the wider, inner part 19 of the bore so as to establish communication between said inner part 19 and the glue channels 25 in the plunger via the gap 32 now defined between the peripheral surface of the bulb 26, and the inner part 19 of the bore.

In the intermediate position illustrated in FIG. 7, part of the glue in the glue chamber 30 has been forced past the bulb and into the channels 25, as indicated by the arrows 33, from where the glue passes out at the inner end of the plug into the bottom chamber 34 located between the bottom 31 of the attachment hole 13 and the free end of the plug. During continued driving of the plug into the attachment hole, the chamber 34 diminishes in volume so as to force glue from the chamber out into the glue channels 22 provided on the plug.

The glue channels 22 are gradually filled, and are partially filled when the plug has been driven-in to such an extent that the cylindrical part 23 of the plug seals in the hole 13. Continued driving of the plug to its fully inserted position results in the glue being pressed out from the glue channels 22, the outer ends of which are closed. The glue thus continues to flow laterally between the mutually abutting surfaces of the plug and the hole.

The plug is provided on its outer surface with a plurality of hook-like projections 36 which grip the wall of the hole when driving in the plug, therewith to anchor the plug in its fully inserted position, as illustrated in FIG. 6, so that the plug seats relatively securely during the time taken for the glue to dry or harden.

The modified plunger 24A in FIG. 8 has a bulb 26,26A at each end and an axial through-going channel 37 to enable air to escape when glue 29 in FIG. 5 has been filled into the glue chamber and the plunger is inserted to the starting position shown in FIG. 5. Thereafter the channel is closed at its end by means of hot melt 38.

I claim:

1. A load absorbing jointing plug intended to be inserted into and glued in a cylindrical attachment hole located in a structural member, such as a wooden structure member, particularly when joining pieces of furniture together, characterized in that the plug has provided therein an axially extending bore which opens out at an insertion end of the plug; in that the bore contains a given quantity of liquid glue which is enclosed in the bore by means of a plunger which is partially inserted into the bore to a starting position and which seals in said bore; and in that the bore and the plunger are so constructed in relation to one another that forcible insertion of the plunger into the bore from a starting position causes glue present in a glue chamber located between a bottom of the bore and an inner end of the plunger to be forced beyond the plunger and out at the insertion end of the plunger, the plunger having an inner end forming a piston which seals in the bore, in a starting position of the plunger, and the plunger having a plurality of axially extending glue channels which extend from the piston to an outer end of the plunger, the plug and plunger providing an arrangement such that when the plunger is urged through a given distance from said sealing starting position, the glue channels provided on said plunger are brought into communication with the glue chamber so that glue is gradually forced through the glue channels on the plunger and out at the end of the plug as the plunger is pressed to its bottom position, an inner part of the bore situated axially inwardly of a location at which the piston seals against the bore in a plunger-starting position having, at least at certain locations, a larger diameter than the piston, so as to provide free passageways for glue to pass beyond the piston when the plunger has moved through a given distance from its starting position and the piston is located in the inner part of the bore, said inner part of the bore having thereon a number of axially extending lands having radially inner surfaces which lie on a geometric cylinder in an extension of a cylindrical outer part of the bore, wherewith channels defined between the lands communicate with the glue channels on the plunger when the plunger has been pressed into the glue chamber.

2. A plug according to claim 1, in which the plug has provided externally thereon small projections which provide a firm grip between a wall of the hole and the plug prior to hardening of the glue driven between a wall of said attachment hole and the plug.

3. A plug according to claim 1, in which the plunger is provided, in a radial plane, with a plurality of projections which are placed in a location such as to serve as abutments for an insertion end of the plug and which determine a starting position of the plunger but do not prevent further driving of the plunger into the plug when the plug is driven into the hole.

4. A plug according to claim 1 in which the plug has the form of a dowel having two mutually identical halves, each of which halves is provided with a respective plunger.

5. A plug according to claim 1 in which an end of the plug opposite an insertion end thereof has an end part which serves as an anchorage for a fastener.

6. A plug according to claim 1 in which each end of the plunger is provided with a said piston.